United States Patent [19]

Cheshir

[11] 3,911,794

[45] Oct. 14, 1975

[54] HYDRAULIC MACHINE ASSEMBLY

[75] Inventor: Keith Cheshir, Cheltenham, England

[73] Assignee: Dowty Mining Equipment Limited, Tewkesbury, England

[22] Filed: Mar. 5, 1974

[21] Appl. No.: 448,231

Related U.S. Application Data

[63] Continuation of Ser. No. 293,948, Oct. 2, 1972, abandoned.

[30] Foreign Application Priority Data

Oct. 1, 1971 United Kingdom............... 45779/71

[52] U.S. Cl................. 92/61; 91/170 MP; 138/111; 285/137 R; 285/361; 285/376; 285/402
[51] Int. Cl.².......................................... F01B 1/02
[58] Field of Search............ 92/61; 91/170 MP, 189; 138/111; 285/137 R, 361, 376, 401, 402; 64/2 R, 3, 4

[56] References Cited
UNITED STATES PATENTS

| | | | |
|---|---|---|---|
| 1,145,885 | 7/1915 | Forst............................. | 285/361 X |
| 2,578,280 | 12/1951 | Barnard........................ | 138/111 X |
| 2,743,960 | 5/1956 | Kamin.......................... | 285/137 R X |
| 2,896,977 | 7/1959 | Hansen......................... | 285/402 X |
| 2,936,791 | 5/1960 | Farrar........................... | 285/137 R X |
| 3,120,105 | 2/1964 | Kibble et al.................. | 91/170 MP X |
| 3,192,722 | 7/1965 | Herrmann et al............ | 91/170 MP X |
| 3,516,691 | 6/1970 | Williams et al............... | 285/137 R |
| 3,523,700 | 8/1970 | Palmer.......................... | 285/137 R |
| 3,747,632 | 7/1973 | Kok et al....................... | 137/375 |
| 3,767,232 | 10/1973 | Smith............................ | 285/137 R X |
| 3,767,234 | 10/1973 | Weirich et al................ | 285/137 R |

FOREIGN PATENTS OR APPLICATIONS

| | | | |
|---|---|---|---|
| 1,097,687 | 1/1968 | United Kingdom........... | 285/137 R |
| 1,156,031 | 6/1969 | United Kingdom........... | 285/137 R |
| 1,197,447 | 7/1970 | United Kingdom........... | 285/137 R |

*Primary Examiner*—Martin P. Schwadron
*Assistant Examiner*—Abraham Hershkovitz
*Attorney, Agent, or Firm*—Young & Thompson

[57] ABSTRACT

A hose connection for use between a pair of relatively movable hydraulic machine members comprising a flexible hose unit incorporating a plurality of hoses, and a two-part coupling for each machine member of which part is mounted on its associated machine member and the other part is carried at an end of the flexible hose unit whereby when both two part couplings are secured together the machine members are hydraulically inter-connected by the hoses in the hose unit.

3 Claims, 6 Drawing Figures

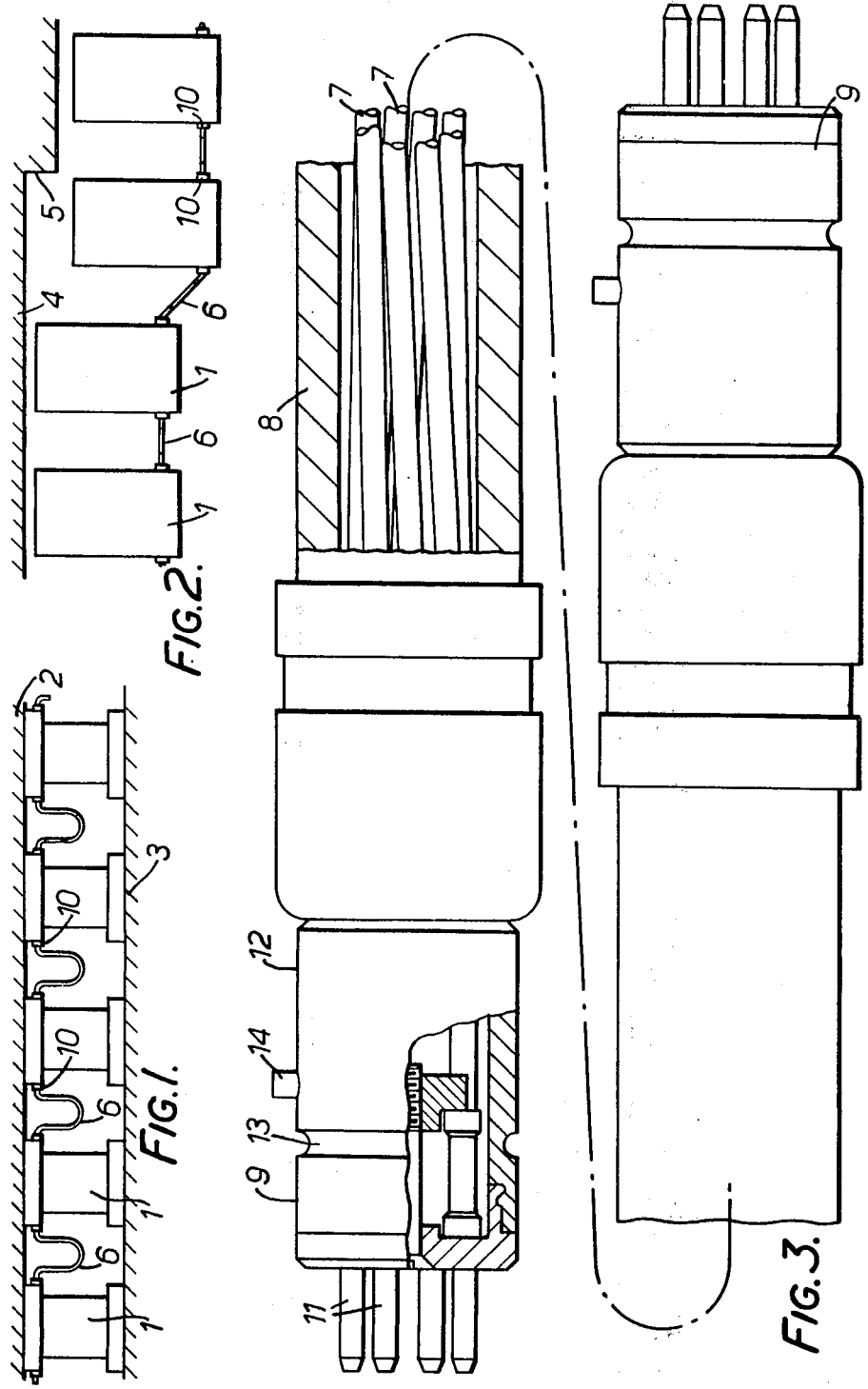

HYDRAULIC MACHINE ASSEMBLY

This is a continuation, of application Ser. No. 293,948, filed Oct. 2, 1972 now abandoned.

This invention relates to a hydraulic machine assembly comprising two or more hydraulic machine members relatively movable to one another and interconnected by a plurality of flexible hydraulic conduits.

An example of such an assembly comprises a hydraulic roof support assembly for use in a mine and operating on the longwall mining principle. In such an assembly a plurality of individual mine roof supports are arranged in line along the coal face, the supports being hydraulically movable one at a time towards the coal face as coal is removed from the face.

In accordance with the present invention a hydraulic machine assembly comprises at least a pair of relatively movable hydraulic machine members, a flexible hose unit incorporating a plurality of hoses, and a two-part coupling for each machine member of which one part is mounted on its associated machine member and the other part is carried at an end of the flexible hose unit whereby when both two-part couplings are secured together the machine members are hydraulically interconnected by the hoses in the hose unit.

The hose unit may be completely removed from the two machine members for renewal or to enable differing machine members having appropriate coupling parts to be connected together.

For preference the two-part couplings are of similar construction and also for preference the coupling parts secured to the ends of the hose unit are similar to one another.

In accordance with a further aspect of the present invention, a hose unit comprises a plurality of flexible hoses, all secured between two coupling parts, one being a part of a two-part coupling and the other being a part of another two-part coupling.

The plurality of flexible hoses may be enclosed in a flexible protective sleeve fixedly secured to the two coupling parts.

Within the sleeve the hoses may be twisted together so that with flexing of the hose unit excessive tension may be prevented in any hose.

One embodiment of the invention will now be described with reference to the accompanying drawings, in which FIGS. 1 and 2 are diagrammatic elevation and plan respectively of part of a mine roof support installation incorporating the invention, FIG. 3 is a view partially in longitudinal section of one flexible hose unit used in FIGS. 1 and 2.

Figure 4:
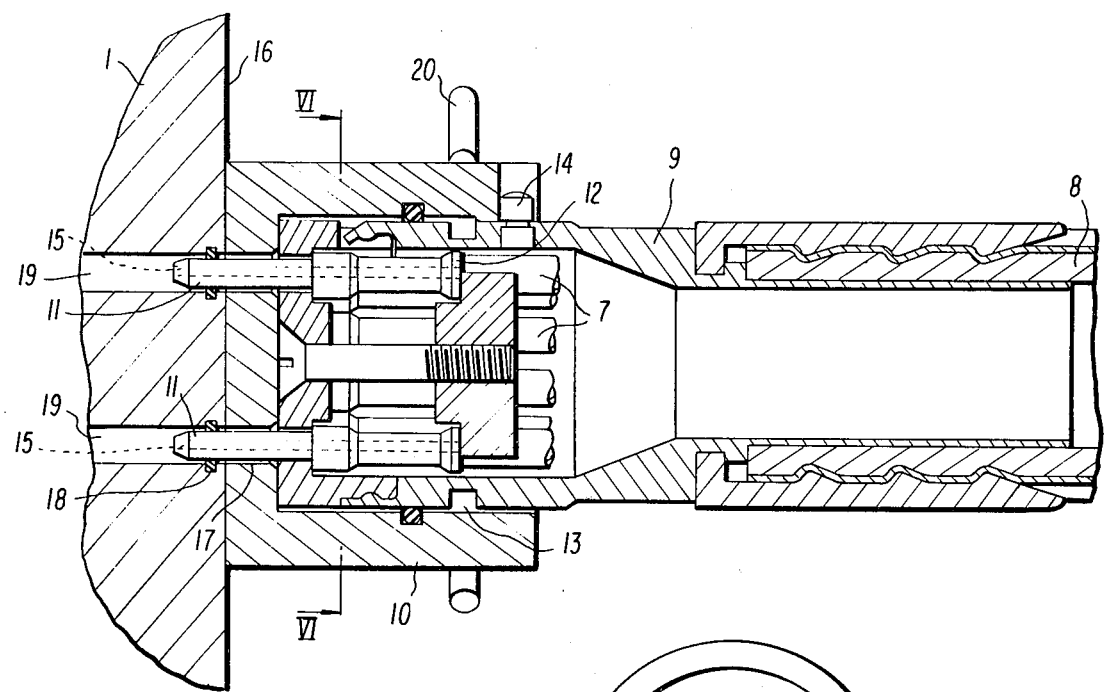
FIG. 4 is a longitudinal cross-section through a two part coupling.
Figure 5:
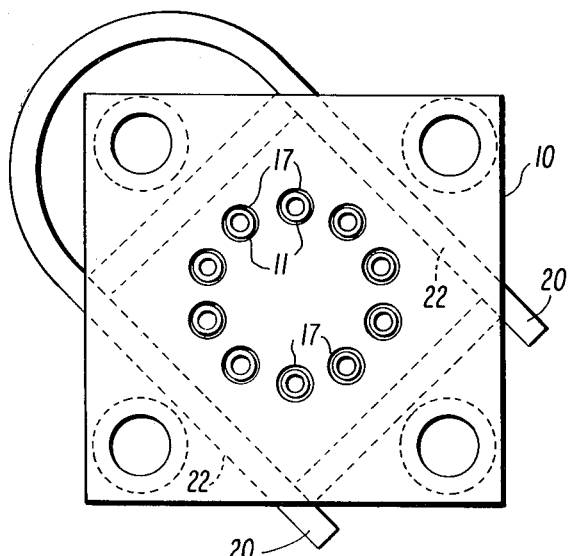
FIG. 5 is an end view of the two part coupling.
Figure 6:
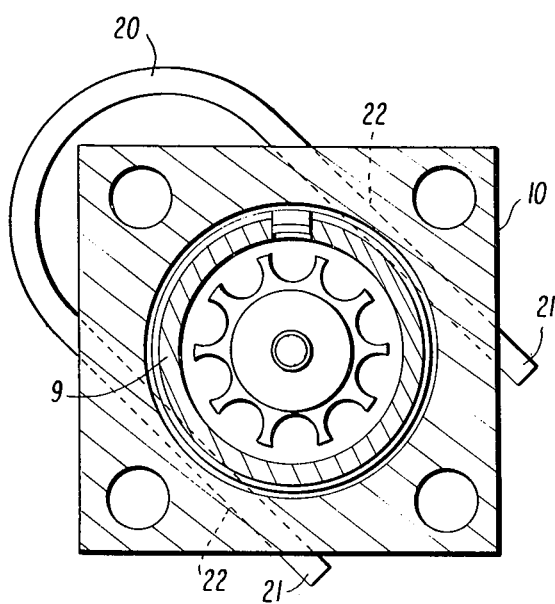
FIG. 6 is a cross-section on the line VI—VI on FIG. 4.

Referring initially to FIGS. 1 and 2 a plurality of hydraulic roof support units 1 are arranged in side by side relation between the roof 2 and the floor 3 of a mine working closely adjacent to a coal face 4. The means for cutting and conveying the coal are not shown but in FIG. 2 the coal face 4 is shown with a step 5 indicating the manner in which coal is cut away from the coal face by a coal cutting machine associated with the supports. More particularly as seen in FIG. 2, the two left hand supports 1 have been moved towards the cutaway portion of the coal face, the other of the units occupying their position before the coal face is cut away. Movement of the supports is effected by hydraulic means, not shown.

Each adjacent pair of roof supports 1 is interconnected by means of a flexible hose unit 6 which is as shown more particularly in FIG. 3. The hose unit as shown in FIG. 3 comprises a plurality of flexible hoses 7 extending through a flexible protective sleeve 8 having at each end thereof a plug 9. Each plug 9 forms part of a two-part coupling, the other part being a socket 10 mounted on the associated roof support. Thus in the described embodiment, each roof support 1 includes a pair of sockets 10 one on either side thereof, each socket being adapted for connection to a plug 9. The two parts of each two-part coupling, referred to in this specification as a plug and a socket, may be as shown in application Ser. No: 293947 filed Oct. 2, 1972 by Keith Cheshir and Peter Farr.

Very briefly each plug 9 includes a plurality of projecting spigots 11 corresponding in number to the number of hoses 7. Each spigot 11 includes a central passage 15 opening to the end thereof. The socket part 10 of the coupling is mounted on wall 16 of a unit 1 and comprises a plurality of sockets 17 in the same relative arrangement as the spigots 11, the sockets being appropriately provided with seals 18 to co-operate with the spigots 11 and being connected internally of the roof supports by passageways 19 to the various hydraulic elements of the roof support. The plug 9 includes a body member 12 around which is formed a groove 13 arranged to receive a locking member 20 in order that it may be locked into its associated socket 10. The locking member comprises a staple 20 having arms 21 which pass through transverse holes 22 in the wall of the socket 10 to engage the groove 13 in the body member 12. Further the body member 12 includes a locating peg 14 for co-operation with a suitable recess in the socket 10 to ensure correct entry of the spigots 11 into their co-operating recesses. The hoses 7 and the protective sleeve 8 between the two plugs 9 may be of considerable length so as to accommodate the relative movement between the roof supports during normal operation.

As shown in FIG. 4, the hose units 6 will during use fall into a U-shape by virtue of their own weight.

Where the protective sleeve 8 is of substantial strength in order to give good protection to the hoses 7 it is found that flexing of the sleeve 8 could produce undue stretching in some of the hoses 7 unless the hoses are twisted together as shown in FIG. 3. Such twisting will ensure that the total length of every hose 7 between the plugs 9 will remain substantially the same during the normal flexing to which the protective sleeve 8 is subjected in use.

In the mine roof support assembly as described when in use in a mine, the flexible hose units 6 are subjected to considerable rough treatment and it is quite possible that on occasions such rough treatment would damage a hose unit to the extent that it is not further usable. In such a circumstance the hose unit may be uncoupled completely from its two roof supports and a new hose unit may be plugged into position. The time loss therefore due to hose damage may be reduced to an absolute minimum.

In the illustrated embodiment the plugs 9 at the two ends of the hose unit 6 are shown of exactly the same structure. Within the broad scope of the present invention it will be appreciated that these plugs need not be of the same construction provided that the plugs are suited to the sockets with which they co-operate. It is further not necessary that the coupling parts at the ends of the hose unit 6 should be plugs. Either or both of the coupling parts could incorporate socket members. Again alternatively, one or both of the coupling parts could comprise both plug and socket connectors. Again alternatively, the two-part couplings could be of the kind having flat surfaces having a plurality of ports therein so that when the coupling parts are secured together ports in either part come into sealed connection one with the other. A pair of such coupling parts may be secured one to either end of a hose unit 6.

I claim:

1. A hydraulic machine assembly comprising a pair of relatively movable hydraulic machine members, a plurality of internal passages in each machine member, a first detachable two part coupling for the first machine member, a second detachable two part coupling for the second machine member, each detachable two part coupling comprising a first part having a first body member secured to the machine member and a plurality of first hydraulic connections within the first body member forming the ends of the said internal passages, a second part having a second body member and a plurality of second hydraulic connections, one body member being of socket formation to receive the other body member within it and a locking member engageable with the two body parts when one is received within the other to lock the body members together against disengagement, and a flexible hose unit comprising a flexible protective sleeve, a plurality of hoses in side by side arrangement within the sleeve and the two second parts of the two part couplings, the second body members being securely attached to the two ends of the flexible protective sleeve and each hydraulic connection within a second body member being attached to a hose end whereby when the hose unit is coupled to the two machine members the hoses establish separate hydraulic flow paths between the internal passages of the two machine members and a flexible mechanical connection between the machine members is formed by the body members, the locking members and the flexible protective sleeve.

2. A hydraulic machine assembly as claimed in claim 1 wherein the locking member for each two part coupling comprises a staple whose arms are engageable in passages in the body members of the two part coupling when engaged one within the other.

3. A hydraulic machine assembly as claimed in claim 1 wherein the hydraulic connections within each two part coupling are of the spigot and socket type.

* * * * *